Oct. 18, 1966    H. A. STERN    3,279,029
METHOD OF SPACING ELECTRON TUBE ELEMENTS
Filed Dec. 17, 1963

INVENTOR.
HERMAN A. STERN
BY
L. A. Larsen
Attorney

3,279,029
METHOD OF SPACING ELECTRON TUBE ELEMENTS
Herman A. Stern, Lancaster, Pa., assignor to Radio Corporation of America, a corporation of Delaware
Filed Dec. 17, 1963, Ser. No. 331,284
8 Claims. (Cl. 29—25.16)

This invention relates to electron tubes, and particularly concerns an improved method of controlling accurately a relatively close spacing between elements of such tubes.

A class of electron tubes known as the "Cermelox" type, comprises radially spaced concentric tubular electrodes including an anode, a cathode, a control grid between the anode and cathode, and a screen grid between the anode and control grid. In the manufacture of this class of tube, a cantilever subassembly is prepared initially comprising imperforate flanged tubular grid blanks and a cathode support, with ceramic rings interposed between the flanges of the grid blanks and the cathode support. The parts referred to are loosely mounted on a suitable brazing jig with an appropriate solder interposed between suitably metallized surfaces of the ceramic rings, and the flanges referred to. The jig with the parts thereon, is then placed in a furnace having a temperature sufficiently high to melt the solder for brazing the parts together to thereby form an integral cantilever structure.

The integral structure so formed is then subjected to an electrical discharge machining operation for cutting radially registering slots through the two imperforate grid blanks. This operation involves immersing the integral structure in a dielectric liquid such as deionized water.

Tubes of the type referred to are operated at ultra-high frequencies. Therefore, the spacing between the electrodes, particularly the spacing between the control grid and screen grid, is very small and should be uniform from tube to tube. This spacing may be as small as 0.005 inch.

Various techniques have been employed in the past for controlling the spacing between electron tube elements during tube manufacture. One of these techniques was to employ a spacer body made of a material that is readily removed during a processing of the tube. However, the use of known materials of this type is not satisfactory in the manufacture of "Cermelox" tubes. The reason for this is that while the material may serve the function of a spacing means during the initial assembly of the parts, the material decomposes when the parts are subjected to the brazing furnace temperature. Such decomposition appreciably reduces the volume of the material and deprives the parts of desirable spacing control during the critical period when the brazing solder is soft and unable to restrain any relative movement of the parts from initially accurately-spaced positions.

In view of this deficiency of decomposable spacing means, it has been proposed to use spacing means made of metal which does not contract in volume and which therefore, continues to serve a spacing function throughout an entire brazing operation. However, difficulties have been encountered in the use of metallic spacing means, both in introducing such means between the elements to be spaced and in removing them on completion of the brazing operation. Failure to remove all of such metallic spacing means may result in an inoperable electron tube. Metallic spacing means in the form of relatively thin wires has been used. However, such wires are easily ruptured with consequent difficulty in removal.

It is therefore an object of this invention to provide an improved method for accurately spacing elements such as electrodes of electron tubes during assembly and brazing operations.

A further object is to provide an improved method for spacing elements in an electron tube which involves the utilization of a non-metallic material as a spacing means that is disposable after the parts have been integrated or fixed against relative movement, and which does not undergo appreciable volume change throughout a relatively wide range of processing temperatures.

The foregoing objects are realized by the use of a spacing material comprising strontium carbonate and an organic binder comprising, for example, nitrocellulose-butyl acetate. A spacing structure made of this material may be in the form of a tape or film cast to the proper thickness by use of the "Doctor Blade" technique. The tape or film may comprise a single layer, or may be made up of several layers or laminations to provide the required thickness for proper spacing of tube elements.

The tape is preferably applied to the inner of the two concentric elements to be spaced. The outer element is then telescoped over the inner taped element. In response to processing temperatures, such, for example, as are required to braze together certain portions of the elements, the material of the spacing tape undergoes a progressive change without losing its spacing function. During the early stages of firing in a brazing furnace, the tape in its initial form maintains the desired space between the elements. At higher temperatures the binder is driven off leaving strontium carbonate. The strontium carbonate continues to provide the desired spacing until a higher temperature (i.e. above 1000° C.) is reached at which higher temperature the strontium carbonate is converted to strontium oxide and remains in the oxide form as an effective spacing medium, at maximum tube processing temperatures.

The continued service of the tape or film of the composition described, as an effective spacing means during the progressively higher temperatures to which it is subjected in tube processing, is a consequence of a significant discovery made by applicant. Applicant has discovered that the volume of the original tape including strontium carbonate and an organic binder, continues substantially unchanged during the subsequent removal of the binder and conversion to the oxide form. As a result, applicant's novel spacing means continues to serve a spacing function throughout the entire range of processing temperatures.

After the concentric elements have been brazed to form an integral structure, there is no further use for the remaining spacing body. Where the brazed elements are imperforate grid blanks, the subsequent operation of cutting registering openings therethrough by electrical discharge machining, involves subjecting the elements including the strontium compound body to the flushing action of a forcibly fed fluid. This removes about 99% of the remaining strontium compound spacer body. The final 1% of the body is removed during later cleaning of the machined structure.

For a more detailed description of an exemplary embodiment of the invention, reference is made to the accompanying drawing in which.

Figure 4:
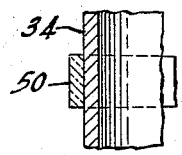
Figure 2:
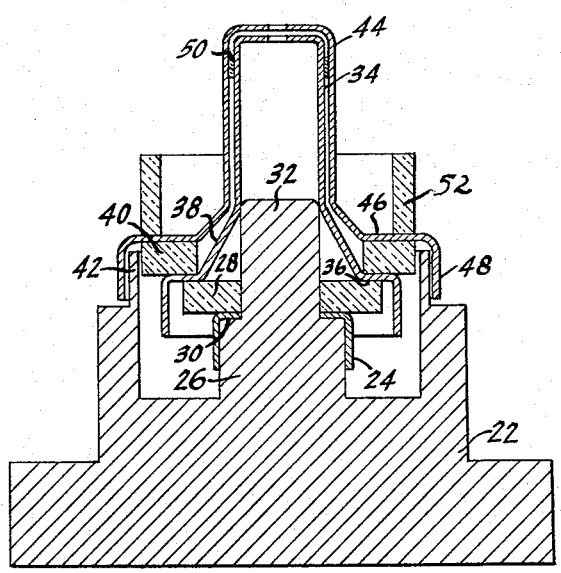
FIG. 2 is a vertical section showing two grid blanks spaced by a tape or film of spacing material according to the invention, and mounted on a brazing jig.
Figure 3:
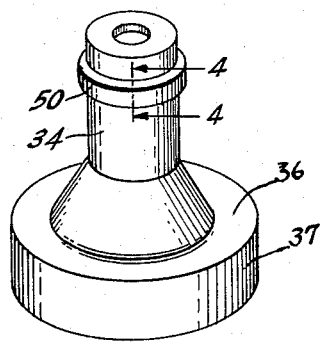

FIG. 3 is a perspective view of the inner of the two grid blanks depicted in FIG. 2, and shows the spacing tape or film, wrapped around the inner blank at a portion thereof that is to become the active region of the eventual grid; and FIG. 4 is a view in cross-section taken along the line 4—4 of FIG. 3 and shows how the spacing tape provides a stand-off body on the grid blank that is adapted to abut an outer grid blank for accurately spacing the two grid blanks.

Figure 1:
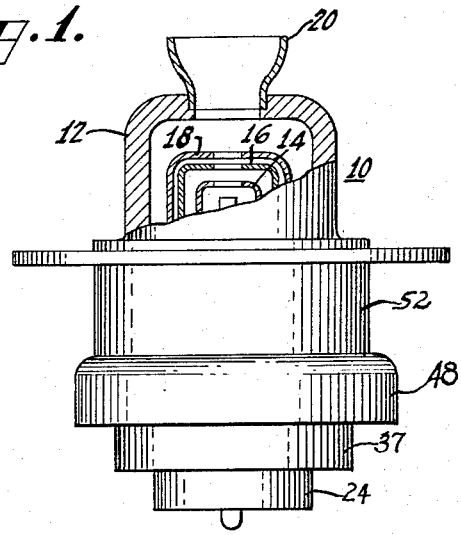
FIG. 1 is an elevational view partly in section of an electron tube that may be made by the method of the invention.

The electron tube 10 shown in FIG. 1 is a tetrode of the "Cermelox" type. It includes four electrodes. One of these electrodes is an anode 12 constituting a portion of the evacuated envelope of the tube. A cathode 14 of the indirectly heated type serves as a source of electrons. Between the anode 12 and cathode 14 is a control grid 16. Between the control grid 16 and the anode 12 is a screen grid 18. Each of these electrodes is tubular in shape and all of them are positioned in concentric relation. The envelope of the tube is evacuated through an exhaust tube 20 which is shown pinched-off after exhaust to provide a hermetic closure.

Since the tube 10 is adapted to be operated at ultra-high frequencies, it is particularly important that the control grid 16 and the screen grid 18 be spaced by a relatively small distance that may, for example, be 0.005 inch, and that this spacing be uniform throughout the facing areas of the two grids. One way in which this spacing can be adversely affected is by an eccentric disposition of the two grids 16, 18. Another way is by a tilting of one of the grids with respect to the other. Both of these conditions of improper spacing are avoided by a practice of the method described herein.

In the manufacture of "Cermelox" type tubes, an integrated subassembly is formed. The parts of this subassembly are first loosely mounted on a brazing jig 22 shown in FIG. 2. The parts so mounted include a cathode support flange 24 snugly engaging the sides and shoulder of cylindrical portion 26 of the jig. The flange 24 is adapted to receive the lower end (not shown) of a cathode. A ring 28, made of an insulating material such as ceramic, rests on an inwardly extending flange 30 of the cathode support and snugly engages the side of cylindrical portion 32 of the jig. An imperforate control grid blank 34 includes a radial flange 36 resting on the insulating ring 28, a cylindrical flange 37, and conical portion 38 engaging the upper region of cylindrical portion 32 of the jig 22. A second insulating ring 40, which also may be made of ceramic, rests on the flange 36 of the control grid blank and snugly engages the inner cylindrical surface of wall 42 of the jig. An imperforate screen grid blank 44 includes a radial flange 46 resting on the insulating ring 42, and a cylindrical flange 48 snugly engaging the outer cylindrical surface of wall 42 of the jig.

When the brazing jig 22 is fabricated to sufficiently close tolerances, the parts referred to are accurately centered at their regions of engagement with the brazing jig. However, the brazing jig 22, no matter how close the tolerances, is incapable of preventing a tilting of the upper portions of the grid blanks 34, 44, as viewed in FIG. 2.

The application of a spacing body 50 of a composition described hereinafter, between the upper portions of the grid blanks 34, 44, as shown in FIG. 2, prevents such tilting. This spacing body 50 may be in any desired form, such as a tape or film 50, for example, wrapped around the upper portion of the grid blank 34, as shown in FIG. 3, prior to mounting the outer screen grid blank 44 thereover. The tape 15, in the instant example, has a thickness of 0.005 inch for spacing the upper portions of the blanks 34, 44, having a minimum distance of 0.005 inch, when snugly engaging both of the blanks. The tape or film 50 should have a sufficient length axially of the grid blanks 34, 44, so as to avoid deformation of the blanks when disposed between the two grid blanks. In the instant example a length of about ¼ inch is found to be suitable.

The tape 50 may be formed by known "Doctor Blade" techniques to the required thickness of 0.005 inch, or the tape may be made up of a plurality of sufficiently thin layers to produce the thickness required of the spacing body. The multi-layer technique is of advantage in that it can be accommodated from a single reservoir of tape to a variety of electron tubes requiring different spacings between a control grid and a screen grid. To cause the tape to stick to the grid blank 34 after it is wrapped around this grid blank, a small amount of binder in liquid form may be applied between the tape and blank prior to wrapping. This binder may be of the same composition as that employed in the spacing material to be described more fully hereinafter. Such binder may also be used to cause multiple layers of tape to be adherent.

If the brazing jig 22 should lack the relatively close tolerances required for an accurate positioning of the lower portions of the grid blanks 34, 44, the lower region, as viewed in FIG. 3, of the cylindrical portion of the grid blank 34 may also be provided with a spacing body similar to body 50. Furthermore, when the spacing between the grid blanks 34, 44, is relatively small, such as of the order of 0.005 inch or less, it is of advantage to use a tape extending the full length of the cylindrical portions of the grid blanks.

The surfaces of the insulating rings 28, and 40 engaging the flanges of the cathode support 24 and the grid blanks 34 and 44, are suitably metallized as with molybdenum and plated with a metal such as nickel, that is wet by solder. A suitable solder, such as BT solder which is an alloy of 28% copper and 78% silver, is interposed between the metallized surfaces of the insulating rings and the metal flanges 30, 36, 46.

An insulating cylinder 52, which also may be made of ceramic is centered on the upper surface of flange 46 by suitable means, not shown. The end surfaces of cylinder 52 are metallized in a manner similar to the way in which insulating rings 28, 40 are metallized and a solder such as BT solder is placed between the engaging surfaces of the cylinder 52 and flange 46.

The brazing jig 22 with the parts thereon as indicated in FIG. 2, is then placed in a brazing furnace having a hydrogen atmosphere. The temperature of the furnace is gradually raised to about 900° C. at which time the BT solder softens and wets the surfaces between which it is disposed. The furnace is then cooled down to room temperature and the solder hardens to integrate or mutually fix the parts mounted on the brazing jig 22 into a self-supporting structure.

Heretofore, where a spacing material other than metal has been used for spacing elements such as grid blanks 34, 44, the material has decomposed and contracted in volume during a raising of the furnace temperature to required brazing temperature. Therefore, at the brazing temperature at which the brazing solder was soft and yieldable, the decomposed and contracted spacing means did not maintain the initially effected desired spacing. As a consequence, any strained position of the grid blanks 34, 44 induced by the initial volume of the spacing means, would be relieved and the relative movement of the grid blanks involved in such release would adversely affect the uniformity of the spacing between the blanks.

Applicant, however, provides a material that is effective as a spacing means throughout the entire range of temperatures incidental to a brazing operation. While a brazing temperature of about 900° C. has been indicated in the foregoing, applicant's new spacing material is capable of withstanding appreciably higher temperatures without undergoing any signficant volume change.

The spacing material consists of strontium carbonate powder dispersed in a suitable organic binder. Any organic binder material is suitable provided it is driven offff at a temperature below the brazing temperature. The amount of strontium carbonate included in this material should be sufficient to avoid any substantial change in the volume of the material from its initial volume and during the successive stages when the binder is driven off and the strontium carbonate is converted to strontium oxide.

A preferred form of the spacer material consists of:

| Material | Amount by Weight, grams | Weight Percent |
|---|---|---|
| Strontium carbonate | 20 | 33.8 |
| Butyl-Acetate | 35.4 | 60 |
| Nitrocellulose (60-80 second) | 1.06 | 1.8 |
| Methylmethacrylate | 0.5 | 0.85 |
| Dibutyl phthalate | 2.1 | 3.55 |

Of these materials the butyl-acetate is a solvent and the remaining material are solids. Apart from the strontium carbonate, the solids are organic. While the amount of solvent in the foregoing preferred example is 60% by weight, it may be varied from 40% to 70% for satisfactory results. The individual solids may also be varied within certain ranges for acceptable results.

The amount of strontium carbonate (20 grams) in relation to the solids referred to in the foregoing example, is 84.5% by weight. This relative amount of strontium carbonate may be varied for satisfactory results from 80% to 90% of the solids. In the foregoing exemplary solution the amount of nitrocellulose may be varied from 1% to 3%, the methylmethacrylate from 0.5% to 1% and the dibutyl-phthalate from 2% to 5%, all by weight, for acceptable results.

The methylemethacrylate contributes desirable plasticity to the spacing body for forming it into a film, while the dibutyl-phthalate serves to render the spacing body flexible with consequent freedom from rupture in handling.

The amount of strontium carbonate may be varied in the range indicated to obtain a control of the brittleness of the spacing body. That is to say, the body has least brittleness with 18 grams of strontium carbonate (i.e. 80% of the solids of the spacer material), and most brittleness when 40 grams of this material (i.e., 90% of the solids of the foregoing exemplary mixture. Thus, for a relatively thin film of spacing material, the amount of strontium carbonate should be near the lower limit of the range, while thicker spacing bodies can tolerate an amount near the upper limit of the range.

In addition to controlling brittleness, the amount of strontium carbonate within the range indicated, also determines the maximum thinness to which the film can be formed. Thus, for the formation of a relatively thin film, a relatively small amount of strontium carbonate within the foregoing range is used.

The amount of the other materials may be varied within the ranges indicated to obtain desirable results. Thus, the amount of organic binder is related to the desired viscosity of the mixture. This viscosity should be within a range to permit convenient forming of the material, as by Doctor Blading, for example, and to permit drying within a reasonable period. The amount of methylmethacrylate in the range indicated may be varied to produce any desired degree of plasticity. The same is also true with respect to the amount of dibutyl-phthalate in relation to flexibility.

In the example described, the mixture was sufficiently thin to form a puddle that could be acted on by a "Doctor Blade" to produce a film or tape of the required thickness of 0.005 inch, for example. The film or tape so produced was dried in air at room temperature for about one hour, to render the film or tape self-supporting and capable of the handling involved in applying or wrapping the film or tape around an element to be spaced.

After the brazing operation has been completed, the assembly integrated during the operation is subjected to an electrical discharge machining operation for cutting radially registering slots through the cylindrical portions of the grid blanks 33, 44. During this operation, the integrated assembly is placed in a trough containing a dielectric liquid such as deionized water. An electrode in the form of a broach is then lowered over the two grid blanks. The broach is provided with teeth having a length for penetrating both blanks 34, 44, and the spacing body 50. A series of electrical discharges between the broach teeth and the grid blanks results in erosion of the material of the blanks and a portion of the spacing body to produce registering longitudinal slots therein. In order to remove the eroded material from the discharge region, these regions as well as the entire integrated assembly, are flushed with the dielectric liquid. Such flushing not only removes the eroded material but also dislodges and carries away most of the spacer body 50 remaining after the brazing operation. It is estimated that about 99% of the spacer material is removed from the integrated assembly in this way.

After the longitudinal slots have been formed in the two grid blanks 34, 44, the integrated assembly is removed from the trough of dielectric liquid and thoroughly cleaned in a conventional water bath comprising a 2 to 5% solution of acetic acid in water. During such cleaning the remaining 1% of the spacer material is removed, thus leaving the integrated assembly completely free of any such material. It is believed that the acid in the water bath contributes to the total removed of the remaining spacer material.

The integrated assembly in which the control grid 16 and the screen grid 18 are relatively closely and uniformly spaced, is then incorporated in the structure of tube 10 in known manner.

What is claimed is:
1. Method of spacing two elements during a brazing operation, comprising:
   (a) interposing between said elements a spacing body made of strontium carbonate dispersed in an organic binder,
   (b) the amount of said strontium carbonate in said body being sufficient to preserve the volume of said body substantially constant in its several forms of strontium carbonate and binder, strontium carbonate alone, and strontium oxide.
   (c) heating said elements, with solder material therebetween, to a brazing temperature at which said solder melts and said spacing body is converted to a body of strontium oxide, and
   (d) removing said body of strontium oxide.
2. Method of spacing two elements during a brazing operation, comprising:
   (a) interposing between said elements a spacing body made of strontium carbonate dispersed in an organic binder, said binder being driven off in response to a predetermined temperature and said strontium carbonate being converted to strontium oxide at a brazing temperature higher than said predetermined temperature and having substantially the same volume as said body,
   (b) heating said elements, with solder material therebetween, to said brazing temperature at which said solder melts, said spacing body being converted to a body of strontium oxide during said heating step, and
   (c) removing said body of strontium oxide.
3. Method of making an electron tube having at least two tubular electrodes in uniformly-spaced concentric relation, comprising:
   (a) mounting said electrodes in cantilever fashion and uniformly spacing said electrodes at their adjacent mounted ends,
   (b) inserting a body of spacing material between the adjacent free end portions of said electrodes, said body having a predetermined uniform thickness for bridging the space between said free end portions, whereby said free end portions are uniformly spaced,
   (c) said body of spacing material consisting of an organic binder and a filler consisting of strontium carbonate, the amount of said strontium carbonate in said spacing body being sufficient to preserve the volume of said body substantially constant during the several changes in the composition of said body throughout a temperature range of from room temperature to at least 900° C., (d) brazing together said electrodes at a temperature within said range to form an integrated assembly in which said electrodes are uniformly spaced, and (e) removing said body of spacing material.

4. Method of making an electron tube having at least two tubular electrodes, said electrodes being concentric and radially spaced uniformly a predetermined distance and having facing cylindrical surfaces, comprising:

(a) applying a tape of spacing material to the facing surface of one of said electrodes, said tape having a uniform thickness substantially equal to said predetermined distance, for bridging the space between said electrodes, (b) mounting said electrodes in concentric relation, (c) said tape consisting of an organic binder and a filler consisting of strontium carbonate, the amount of said strontium carbonate in said spacing tape being sufficient to preserve the thickness dimension of said tape substantially constant during the several changes in the composition thereof throughout a temperature range of from room temperature to at least 900° C., (d) brazing together said electrodes at a temperature within said range to form an integrated assembly in which said electrodes are uniformly spaced, and (e) removing said tape of spacing material.

5. Method of making an electron tube having at least two tubular electrodes in uniformly-spaced concentric relation, whereby said electrodes have facing cylindrical surfaces, comprising:

(a) positioning a body of spacing material around the facing surface of one of said electrodes, (b) mounting the other of said electrodes in concentric relation with respect to the other of said electrodes, (c) said body having a predetermined uniform thickness for bridging the annular space between said electrodes, (d) said body of spacing material consisting of an organic binder and a filler consisting of strontium carbonate, the amount of said strontium carbonate in said spacing body being from 80 to 90% by weight of said body to preserve the volume of said body substantially constant during the several changes in the composition of said body throughout a temperature range of from room temperature to as least 900° C., (e) brazing together said electrodes at a temperature within said range to form an integrated assembly in which said electrodes are uniformly spaced, and (f) removing said body of spacing material.

6. Method of making an electron tube subassembly comprising at least two tubular electrodes in uniformly-spaced concentric relation, whereby said electrodes have facing cylindrical surfaces, comprising:

(a) wrapping a body of spacing material around the facing surface of one of said electrodes, (b) mounting the other of said electrodes in concentric relation with respect to the other of said electrodes to form a loose assembly, (c) said body having a predetermined uniform thickness for bridging the annular space between said electrodes, (d) said body of spacing material consisting of an organic binder and a filler consisting of strontium carbonate in an amount from 80% to 90% by weight of said binder, and (e) heating said loose assembly to a brazing temperature for brazing said loose assembly into a rigid unitary structure, (f) said strontium carbonate continuing as an effective spacing means during the heating of said assembly, whereby said electrodes are in uniformly spaced relation in said rigid structure.

7. Method of making an electron tube having at least two tubular electrodes, said electrodes having flanges and being concentric and radially spaced uniformly a predetermined distance and having facing cylindrical surfaces, comprising:

(a) applying a tape of spacing material to the facing surface of one of said electrodes, said tape having a uniform thickness substantially equal to said predetermined distance, for bridging the space between said electrodes and to effectively space said electrodes at a predetermined brazing temperature, (b) mounting said electrodes in concentric relation to form a loose subassembly with brazing material between said flanges having a melting point at said predetermined brazing temperatures, (c) said tape consisting of an organic binder and a filler consisting of strontium carbonate, (d) heating said subassembly to said brazing temperature, for integrating said subassembly, (e) and mounting said integrated subassembly in a structure to form an electron tube.

8. Method of spacing two elements during a brazing operation, comprising:

(a) interposing between one group of two opposite portions of said elements, a spacing body consisting of from 80% to 90% by weight of strontium carbonate and the remainder an organic binder, and interposing between another group of opposite portions spaced from said first-named group, a body of solder having a predetermined brazing temperature, (b) heating said elements, said spacing body, and said solder body to said predetermined brazing temperature while preserving the volume of said spacing body at its initial value, (c) cutting apertures through said brazed elements and through said spacing body while removing a portion of said spacing body, and (d) washing the apertured brazed elements while removing the remainder of said spacing body.

References Cited by the Examiner

UNITED STATES PATENTS

| | | | |
|---|---|---|---|
| 2,413,731 | 1/1947 | Samuel | 29—25.16 X |
| 2,980,984 | 4/1961 | Shrader | 29—25.14 |
| 2,990,382 | 6/1961 | Wagner | 260—17 |
| 3,051,669 | 8/1962 | Emblem | 260—17 |
| 3,081,526 | 3/1963 | Donnell | 29—423 X |
| 3,146,515 | 9/1964 | Ragland | 29—25.17 |

JOHN F. CAMPBELL, *Primary Examiner.*

WHITMORE A. WILTZ, *Examiner.*

W. I. BROOKS, *Assistant Examiner.*